US009224343B2

(12) United States Patent
Andersson Ersman et al.

(10) Patent No.: US 9,224,343 B2
(45) Date of Patent: Dec. 29, 2015

(54) FIXED IMAGE DISPLAY DEVICE AND METHOD OF MANUFACTURING THE SAME

(71) Applicants: Peter Andersson Ersman, Finspång (SE); Göran Gustafsson, Linköping (SE); David Nilsson, Vikingstad (SE); Jun Kawahara, Norrköping (SE); Kazuya Katoh, Tokyo (JP)

(72) Inventors: Peter Andersson Ersman, Finspång (SE); Göran Gustafsson, Linköping (SE); David Nilsson, Vikingstad (SE); Jun Kawahara, Norrköping (SE); Kazuya Katoh, Tokyo (JP)

(73) Assignees: ACREO SWEDISH ICT AB, Kista (SE); LINTEC CORPORATION, Tokyo (JP)

( * ) Notice: Subject to any disclaimer, the term of this patent is extended or adjusted under 35 U.S.C. 154(b) by 209 days.

(21) Appl. No.: 13/716,824

(22) Filed: Dec. 17, 2012

(65) Prior Publication Data

US 2013/0162512 A1   Jun. 27, 2013

Related U.S. Application Data

(60) Provisional application No. 61/578,913, filed on Dec. 22, 2011.

(30) Foreign Application Priority Data

Feb. 2, 2012   (EP) ..................................... 12153599

(51) Int. Cl.
*G02F 1/155* (2006.01)
*G09G 3/34* (2006.01)
*G02F 1/15* (2006.01)

(52) U.S. Cl.
CPC ................ *G09G 3/344* (2013.01); *G02F 1/155* (2013.01); *G02F 1/1508* (2013.01); *G02F 2001/1515* (2013.01); *G02F 2001/1519* (2013.01); *G02F 2001/1555* (2013.01); *Y10T 156/10* (2015.01)

(58) Field of Classification Search
CPC ....... G02F 1/155; G02F 1/1335; G02F 1/153; G02F 1/17
USPC ........... 345/107; 349/106; 350/357; 359/267, 359/269, 270, 273
See application file for complete search history.

(56) References Cited

U.S. PATENT DOCUMENTS 4,187,004 A  *  2/1980  Yano et al. .................... 359/274
5,847,860 A  *  12/1998  Hougham et al. ............ 359/267

(Continued)

FOREIGN PATENT DOCUMENTS

EP          1921496           5/2008
EP          2312386 A1        4/2011

(Continued)

OTHER PUBLICATIONS

European Search Report dated Apr. 25, 2013 issued in European Application No. EP 12192052.

(Continued)

*Primary Examiner* — Abdul-Samad A Adediran
(74) *Attorney, Agent, or Firm* — Harness, Dickey & Pierce, P.L.C.

(57) ABSTRACT

There is provided a display device, which is arranged to display a predetermined fixed image, having a pixel electrode layer comprising a plurality of pixel portions, and opaque solidified electrolyte arranged in a plurality of separated segments in ionic contact with a respective pixel portion, wherein each electrolyte segment and respective pixel portion form a pixel element. The fixed image display further comprises at least one continuous electrode layer extending across at least two rows and two columns of the pixel matrix, and is connected to the electrolyte segments of a subset of the pixel elements. Upon application of an electric potential difference between the patterned electrode layer and the pixel electrode layer, the pixel portions of the subset of the pixel elements switch color.

19 Claims, 4 Drawing Sheets

(56) References Cited

U.S. PATENT DOCUMENTS

| | | |
|---|---|---|
| 7,333,257 B2 | 2/2008 | Reynolds et al. |
| 2003/0156314 A1* | 8/2003 | Shinozaki et al. ............ 359/273 |
| 2004/0252099 A1 | 12/2004 | Walder et al. |
| 2005/0068603 A1 | 3/2005 | Berggren et al. |
| 2007/0076287 A1 | 4/2007 | Berggren et al. |
| 2007/0182705 A1 | 8/2007 | Leyland et al. |
| 2008/0002110 A1* | 1/2008 | Choi ............................ 349/106 |
| 2009/0013350 A1 | 1/2009 | Ohlfs et al. |
| 2010/0251955 A1 | 10/2010 | Knoll |
| 2012/0038967 A1* | 2/2012 | Copeland et al. ............ 359/269 |
| 2012/0050838 A1* | 3/2012 | Hirano et al. ................. 359/273 |
| 2012/0081775 A1* | 4/2012 | Ersman et al. ................ 359/270 |

FOREIGN PATENT DOCUMENTS

| | | |
|---|---|---|
| GB | 2295242 | 5/1996 |
| JP | 2010054597 A | 3/2010 |
| WO | WO 00/68733 | 11/2000 |
| WO | WO 2005/053005 | 6/2005 |
| WO | WO 2005/078698 | 8/2005 |
| WO | WO 2008/136696 | 11/2008 |
| WO | WO-2010099147 A1 | 9/2010 |

OTHER PUBLICATIONS

James P. Coleman, "Printed, Flexible Electrochromic Displays Using Interdigitated Electrodes", Solar Energy Materials and Solar Cells, Elsevier Science Publishers, Amsterdam, vol. 56, No. 3-4, Dec. 30, 1999, pp. 395-418, XP004154421.

Peter Andersson, "Printable All-Organic Electrochromic Active-Matrix Displays", Advanced Functional Materials, 2007, pp. 3074-3082, XP-001507483.

Avni A. Argun, "Back-Side Electrical Contacts for Patterned Electrochromic Devices on Porous Substrates", Advanced Materials, Feb. 23, 2005, pp. 422-426.

European Search Report for European Application No. 12153599.1 dated Mar. 21, 2012.

* cited by examiner

FIXED IMAGE DISPLAY DEVICE AND METHOD OF MANUFACTURING THE SAME

CROSS-REFERENCE TO RELATED APPLICATIONS

The present application hereby claims priority under 35 U.S.C. §119 on European patent application number 12153599.1 filed Feb. 2, 2012 and hereby claims priority under 35 U.S.C. §119(e) on U.S. provisional patent application No. 61/578,913 filed Dec. 22, 2011, the entire contents of each of which are hereby incorporated herein by reference.

FIELD OF THE INVENTION

The present invention relates to electrochemically active organic fixed image display devices and the manufacturing of such devices. In particular, the present invention relates to printable, electrochemically active fixed image display devices based on organic electrochromic and electrochemically active materials, which display device is arranged to display, when activated, a predetermined fixed image in a display area of the display device, wherein the fixed image comprises at least one motif area and at least one background area which areas in combination define the fixed image visually perceived by the end user observing the display device.

BACKGROUND ART

In the field of printed electronics, comprising electrochemically active thin film devices based on organic electronics, it is known to provide flexible displays and structures by means of common printing techniques and equipment, such as screen printing, flexography, gravure, offset lithography and inkjet printing.

One type of flexible display is the fixed image display device, which upon activation is arranged to display one single fixed image. The image is fixed, hence, the fixed image display device is not arranged to display different, or moving, images as in the case of dynamic image display devices which comprise means or active control devices for addressing or switching separated portions of the dynamic image display device in order to change the displayed image or to display a different image. Instead, in the fixed image display device, the predetermined fixed image may be switched on or off, e.g. by application of an activation voltage between a pixel electrode and a counter electrode.

Compared to dynamic display devices the architecture of the electrochemically active and organic fixed image thin film display device is considerably simpler and allows for more cost effective manufacturing. In particular, the image to be displayed by the fixed image display device may be provided by e.g. patterning the active pixel electrode, or the electrolyte, into the desired fixed image. Hence, the fixed image is integrated into the device architecture of the fixed image display device, such that the fixed image is displayed upon activation of the device.

One example of a fixed image display device is illustrated and described in relation to FIGS. 16A to 16D in WO 2010/099147. As illustrated in FIG. 16B, the fixed image to be displayed by the display device is defined by providing an opacifier layer which is arranged to hide some details of the display device for the end user, such as a viewer or an observer of the display. In more detail, according to one example, the opacifier layer comprises a hole (e.g. hole 1631) which exactly matches the image to be presented to the end user. Hence, the fixed image to be displayed is defined by the gap in the opacifier layer. According to a second example, the opacifier layer comprises a hole (e.g. hole 1628) which is larger than the image shown to the end user. Instead, a chromic layer, illustrated in FIG. 16C, is patterned into, or given the same shape as, the fixed image shown to the end user (e.g. chromic layer 1606) since the opacifier layer in front of it does not create the image.

However, a drawback with known fixed image display devices based on layered electrochemically active and organic materials, is that the fixed image of the fixed image display device may be observed by the end user even before the application of an activation voltage. For example, differences in color, and/or reflection, between the opacifier layer and the chromic layer in the first example above, or between the chromic layer and the background layer in the second example above, may typically be detected by the end user. Hence, in other words, the fixed image of the fixed image display device is not truly hidden when the fixed image display device is turned off, or in its non-active state. In addition, high alignment requirements for manufacturing known fixed image display devices entail expensive and inefficient manufacturing processes involving e.g. exact matching of the opacifier layer in relation to the chromic layer.

The most apparent solutions to these problems would be to select a different material for the opacifier, or background layer, such that the difference in visual appearance between the chromic layer and the opacifier, or background layer, is minimized when the display is in a non-active state. Furthermore, known fixed image display devices based on layered electrochemically active and organic material normally suffer from non-uniform switching of the fixed image, as the switch of the electrochromic material normally starts at one end of the material and progresses throughout the remaining electrochromic material until the whole volume is switched.

SUMMARY OF THE INVENTION

In view of the above-mentioned and other drawbacks of the prior arts, a general object of the present invention is to provide an improved flexible fixed image display device and an improved method for manufacturing a fixed image display with respect to e.g. the ability to hide the image of the display device in the off state of the display. These and other objects are met by the subject matters provided in the independent claims. Preferred embodiments of the invention are presented in the dependent claims.

According to a first aspect thereof, the present invention relates to a flexible fixed image display device arranged to display, when activated, a predetermined fixed image in a display area, which fixed image comprises at least one motif area and at least one background area. The fixed image display device comprises a pixel electrode layer comprising the display area, which pixel electrode layer is continuous throughout the display area and comprises electrochromic and electrochemically active organic polymer material being switchable between different visually detectable coloring states. The fixed image display device further comprises solidified electrolyte arranged, in a viewing direction, behind the pixel electrode, which solidified electrolyte is in ionic contact with the pixel electrode layer. The pixel electrode layer comprises a plurality of pixel portions arranged in the display area, and the solidified electrolyte is essentially opaque and arranged in a plurality of electrolyte segments, which segments are geometrically separated and ionically isolated from each other, each electrolyte segment being in ionic contact with a respective pixel portion of the pixel electrode layer. Each pair of electrolyte segment and respective pixel portion forms a pixel element, the pixel elements being arranged in a matrix comprising rows and columns, the matrix comprising a first set of pixel elements forming the motif area, and a second set of pixel elements forming the background area. The fixed image display device further comprises at least one continuous electronically conductive patterned electrode layer arranged, in the viewing direction, behind the electrolyte segments, wherein the patterned electrode layer extends across at least two rows and two columns of the matrix, and is electronically connected to all electrolyte segments of at least a subset of the first set of pixel elements, the subset comprising at least two pixel elements, and wherein, upon application of an electric potential difference between the patterned electrode layer and the pixel electrode layer, the pixel portions of the subset of the first set of pixel elements switch their coloring state.

The invention is based on the realization of the inventors that an improved fixed image display device is realized by providing a pixelated fixed image display device wherein a first set of motif pixel elements are active and arranged to switch by application of a potential difference between the hidden patterned electrode layer, being arranged behind the pixel elements, and the electrochemically active pixel electrode layer which is arranged in a front portion of the display device, and by providing a second set of background pixel elements, wherein the first set of motif pixel elements and the second set of background pixel elements, each comprising opaque electrolyte segment, have essentially the same color and reflection when the fixed image display device is not activated. Hence, the predetermined fixed image to be displayed upon activation of the display device, and which is determined by the hidden continuous electronically conductive patterned electrode layer, cannot, or can essentially not, be observed by the end user when the display is in a non-active state.

Hence, the present invention advantageously provides a fixed imaged display device and a fixed image display architecture which considerably more efficiently conceals, or hides, the fixed image to be displayed when the fixed image display device is not in an active state, or on-state. For example, a viewer observing the display device from a normal viewing distance, such as from 20 cm and further, will perceive a uniform display area having an essentially uniform color throughout the complete display area, depending on the size, or area, of each individual pixel element.

Furthermore, the fixed image display device architecture according to the present invention allows for efficient and low cost manufacturing using conventional printing techniques. In particular, the pixelated design comprising pixelated electrolyte segments and pixel portions of the pixel layer in combination with a patterned electrode layer being arranged into a desired shape, such as a subset of the motif pixel elements, allows for reduced alignment, or registration, of the patterned electrode layer in relation to the pixel elements, while the pattern of the patterned electrode layer defines the fixed image. The patterned electrode may e.g. be arranged as a figurative motif, or as one or more graphical symbols, such as a set of lines, squares, triangles, circles etc. It may also be arranged as a figurative symbol, such as a flower or trademark, or as one or several letters in any alphabet, or characters, or as a signature, or as a combination of the above. The shape of the electrode is not limited to the examples mentioned above, but is free to be given any shape. Furthermore, the fixed image display device of the present invention advantageously enables efficient manufacturing using conventional printing techniques and equipments, such as screen printing, flexography, gravure, offset lithography and inkjet printing.

In particular, low-cost printing which may be defined as manufacturing using conventional printing methods in normal regular ambient conditions, such as room temperature, is advantageously realized. Low-cost printing may e.g. comprise manufacturing in a temperature interval around room temperature of 15 to 30 degrees Celsius, such as between 10 and 60 degrees Celsius, or between 10 and 35 degrees Celsius. In other words, the arrangement or printing of one or several of the different layers of the display device is performed in a temperature interval around room temperature. The manufacturing may further comprise thermal drying processes involving higher temperatures, e.g. to shorten the drying time, solidifying and/or curing layers and segments of the fixed image display device, such as the electrolyte segments. In addition, low-cost printing manufacturing may further advantageously entail processing steps, such as arrangement or printing of one or several of the different layers in normal pressure conditions, such as about 100 kPa or 1 atm, or in pressure conditions between 80 and 120 kPa, and in ambient air conditions. Hence, in low-cost printing manufacturing, expensive and cumbersome equipment and/or manufacturing conditions, such as vacuum and/or clean room facilities, or similar facilities, are not required or may be significantly reduced.

The vertical and pixelated architecture of the fixed image display device according to the present invention further improves the display characteristics by improving color contrast and sharpness of the fixed image to be displayed. In particular, the pixelated design, comprising separate and isolated pixelated electrolyte segments and pixel portions, restricts the electrochemical reaction of each one of the pixel elements in the first set to a specified area. Hence, undesired spreading or migration effects into undesired regions caused by the electric potential enabling the electrochemical reaction in each active pixel, which would reduce image quality and sharpness, may efficiently be reduced.

Also, by providing a continuous patterned electrode layer in combination with pixelated pixel elements, improved characteristics in terms of more uniform switching and/or shortened switching time, may be enabled. In particular, the highly conducting patterned electrode layer, being arranged behind the pixel elements, efficiently provides electric drive power to switch each of the pixel elements in the subset in a similar and simultaneous manner, with reduced losses. Furthermore, by being arranged in a pixelated vertical configuration comprising a plurality of highly similar vertical pixel elements, each having shortened switching times and more predictable switching characteristics, the switching time and switch operation of the fixed image to be displayed is reduced and improved. It is to be understood that the switching time or the color change of a pixel element is further generally affected by e.g.:

the mobility of ions in the electrolyte, the higher the mobility the shorter the switching time;
the magnitude of the ionic current in the electrolyte, which is determined both by the ion mobility in the electrolyte as well as the electrolyte volume and the ion concentration in the electrolyte;
the choice of electrochemically active and/or electrochromic material;
the volume of the electrochemically active and/or electrochromic material that needs to be reacted in order to alter the color of the electrochromic material;
the amplitude of the applied voltage; the higher the voltage the shorter the switching time, and vice versa.

The architecture of the fixed image display device enables a versatile fixed image display device, wherein the fixed image to be displayed by the display is determined by the patterned electrode layer, which layer extends across at least two rows and two columns of the matrix of pixel elements to form at least a portion of the fixed image. Hence, various fixed image designs may advantageously be provided by changing the design, or pattern, of the patterned electrode layer.

For example, the pixel elements of the first set, i.e. the motif pixel elements, are arranged to switch coloring state upon activation of the display, such that the fixed image is defined by the switched pixels in relation to the pixel elements in the second set of pixel elements, i.e. the background pixel elements. According to one embodiment all materials, or all layers, forming the fixed image display device are flexible, such that the resulting fixed image display device is also flexible, and/or rollable. In other words it may be repeatedly bent or rolled without breaking. For example, when bending or rolling the device the radius of curvature may be less than e.g. 75% or 50% of the length of the bent side of the display device, or of the length of the bent side of the display area of the display device.

The shape of the pixel elements may e.g. be square, or rectangular, or any other suitable form, having e.g. rounded corners. The pixel elements may further be arranged in an orthogonal, or e.g. skewed matrix having rows and columns which are tilted in relation to each other. For example, the matrix forms an m*n matrix, wherein m and n represents rows and columns, respectively, and wherein m and n can be any positive number which is greater than or equal to two. According to an exemplifying embodiment, the fixed image display device further comprises a transparent top layer which is arranged, in the viewing direction, in front of the pixel electrode layer, wherein the top layer continuously covers the display area of the pixel electrode. The top layer advantageously protects the fixed image display device and improves its life span. The provision of a top layer may further facilitate efficient low-cost manufacturing wherein the top layer may be used as a carrier onto which the pixel layer is printed in the roll-to-roll process. In turn, the pixel layer may be made thinner which improves switching properties of the display device.

The pixel electrode layer is, according to one embodiment, transparent, or semi-transparent, at least in one coloring state.

According to an exemplifying embodiment, the fixed image display further comprises a continuous insulating layer arranged between the pixel electrode layer and the patterned electrode layer, directly adjacent to the patterned electrode layer, which insulating layer comprises a plurality of passages which enable electronic connection between the patterned electrode layer and the electrolyte segments. A continuous insulating layer allows for a durable and self-supporting fixed image display device, and further facilitates manufacturing of the device, wherein the insulating layer may reduce cross-talk and/or interference between separate pixel elements, and/or between the pixel electrode layer and the patterned electrode layer.

For example, the insulating layer is self-supporting, it may have an essentially uniform thickness, it may be flexible, and/or continuous in relation to the view area of the fixed image display.

According to a further embodiment, the fixed image display device further comprises a plurality of geometrically separated counter electrode segments, each counter electrode segment being arranged between, and in direct contact with, a respective electrolyte segment and, in the viewing direction, a front side of the insulating layer, wherein each one of the plurality of through passages comprises an electronically conductive material which electronically connects each separated counter electrode segment with the patterned electrode layer. The counter electrode segment of the respective pixel element enables switching of the coloring state of the first set of pixel elements, while enabling a similar and cost efficient pixel element design to the second set of pixel elements. In other words, the pixel elements of the fixed image display device, each comprises a pixel portion formed of an integrated portion of the continuous pixel layer, and an electrolyte segment which is sandwiched between the pixel portion and the counter electrode, such that a complete pixel element is formed on one side of the insulating layer, wherein the patterned electrode layer advantageously is arranged on the other side of the insulating layer.

According to various exemplifying embodiments of the insulating layer, it comprises a flexible plastic film with an essentially uniform thickness between 5 and 1000 µm, or between 10 and 500 µm, or between 10 and 250 µm. The insulating layer may also, according to various exemplifying embodiments, be formed of, or comprise, lacquer and/or varnish, which may be provided by printing. According to further embodiments of the invention the thickness of the insulating layer is between 20 µm and 150 µm. According to some examples the thickness of the insulating layer is at least 10 µm, or at least 20 µm, or at least 50 µm. Further, the thickness of the insulating layer is at most 200 µm, or at most 150 µm, or at most 100 µm. Additionally, the thickness of the insulating layer may be within an interval of any of these higher and lower limits, such as 10 µm to 150 µm or 50 µm to 150 µm.

For example, the electrolyte segment, and/or the patterned electrode layer, is printed directly, deposited, or arranged by other means, on the uniform surface of the insulating layer.

According to an alternative, or optional embodiment, the insulating layer is arranged in regions between the electrolyte segments, vertically between the pixel electrode layer and the patterned electrode layer. In other words, the insulating layer forms the negative structure, or layer, in relation to the plurality of electrolyte segments, wherein the complete electrolyte segments are arranged in the corresponding openings of the insulating layer. Hence, undesired cross-talk and interference between the patterned electrode layer and the pixel electrode layer may be reduced, or avoided.

Moreover, the patterned electrode layer is, according to an embodiment, arranged in direct ionic contact with the electrolyte segments of the subset of pixel elements, wherein geometrically separated and electronically interconnected electrode portions of the patterned electrode layer form counter electrodes for the subset of pixel elements, respectively. This architecture allows e.g. for yet more efficient manufacturing, wherein a first patterned electrode layer, the pattern of which defines at least a portion of the fixed image to be displayed, also is utilized as counter electrode for each one of the pixel elements in the first subset associated with the patterned electrode layer. Hence, during the manufacturing step of providing the patterned electrode layer, the fixed image to be shown is defined and realized, while each electrochemical cell formed of the pixel elements are provided with its respective functional counter electrode which enables switching of coloring state during operation.

According to a further embodiment of the present invention, the electrolyte comprises a dye or pigment, such as dispersed titanium dioxide particles. A dye or pigment content in the electrolyte advantageously increase the opaqueness of the electrolyte, which further conceals the fixed image contour for the end user when the display device is not activated.

The patterned electrode layer of the fixed image display device may, according to various embodiments, comprise carbon, conductive polymer, or metal, and/or combinations thereof. For example, carbon paste which may be printed using low-cost printing techniques and equipment may be utilized.

According to a further embodiment, the subset of pixel elements comprises at least two, or more, pixel elements, and the second set of pixel elements comprises at least two, or more, pixel elements. For example, a small fixed image device comprising a relative low number of pixel elements, such as 2*2, 3*3, or 2*3 matrices of pixel elements, may be provided. Larger display device may comprise rows and/or columns of 10-100, and/or 100-1000, and/or 1000-10000, and/or more than 10000 pixel elements each.

According to an exemplifying embodiment, the first set of pixel elements of the fixed image display device comprises a plurality of separate subsets, and a plurality of continuous electronically conductive patterned electrode layers, each patterned electrode layer being electronically connected to a respective subset of the first set of pixel elements.

According to one embodiment and in order to keep a background pixel element functionality of the second set, the background pixel elements, or the pixel elements of the second set of pixel elements, in the fixed image display device are arranged to be non-switchable during operation of the fixed image display device. This may be achieved e.g. by arranging these pixel elements such that they are disconnected from, or not in physical, electronic or ionic contact with, the patterned electrode layer which is used for activating the pixel elements of any of the subset of pixel elements of the first set comprising the motif pixel elements.

According to a further aspect thereof, the present invention relates to a method for manufacturing a flexible fixed image display device arranged to display, when activated, a predetermined fixed image in a display area, the fixed image comprising at least one motif area and at least one background area, which method comprises: providing a pixel electrode layer comprising the display area, which pixel electrode layer is continuous throughout the display area and comprises electrochromic and electrochemically active organic polymer material being switchable between different visually detectable coloring states, and providing electrolyte arranged, in a viewing direction, behind the pixel electrode layer, which electrolyte is in ionic contact with the pixel electrode layer. The method further comprises providing the electrolyte in a plurality of electrolyte segments, which segments are geometrically separated and ionically isolated from each other, each electrolyte segment being in electronic contact with a respective pixel portion of the pixel electrode layer, wherein each electrolyte segment and respective pixel portion form a pixel element, the pixel elements being arranged in a matrix comprising rows and columns, wherein the matrix comprises a first set of pixel elements forming the motif area and a second set of pixel elements forming the background area, and providing a continuous electronically conductive patterned electrode layer arranged, in the viewing direction, behind the electrolyte segments, wherein the patterned electrode layer extends across at least two rows and two columns of the matrix, and is electronically connected to the electrolyte segments of at least a subset of the first set of pixel elements, the subset comprising at least two pixel elements, and wherein, upon application of a potential difference between the patterned electrode layer and the pixel electrode layer, the pixel elements of the subset of the first set of pixel elements are arranged to switch coloring state. The method provides an improved fixed image display device having improved display image properties and switch characteristics. Furthermore, improved concealing of the predetermined fixed image to be displayed upon activation of display device, and which is determined by the hidden continuous electronically conductive patterned electrode layer, is advantageously provided. Furthermore, the manufacturing process according to the present aspect of the present invention allows for efficient and scalable manufacturing using conventional printing techniques, such as low-cost printing described above. The method for manufacturing the fixed image display device is further advantageous in similar manners as described above in relation to the fixed image display device, and embodiments thereof.

According to an additional aspect thereof, the invention relates to a method for manufacturing a flexible fixed image display device arranged to display, when activated, a predetermined fixed image in a display area, the fixed image comprising at least one motif area and at least one background area, which method comprises:

providing (a):
  a pixel electrode layer comprising the display area, which pixel electrode layer is continuous throughout the display area and comprises electrochromic and electrochemically active organic polymer material being switchable between different visually detectable coloring states, and
  solidified electrolyte arranged, in a viewing direction, behind the pixel electrode layer, which solidified electrolyte is in ionic contact with the pixel electrode layer, wherein the pixel electrode layer comprises a plurality of pixel portions arranged in the display area, and the solidified electrolyte is essentially opaque and arranged in a plurality of electrolyte segments, which segments are geometrically separated and ionically isolated from each other, each electrolyte segment being in ionic contact with a respective pixel portion of the pixel electrode layer,
  wherein each electrolyte segment and respective pixel portion form a pixel element, the pixel elements being arranged in a matrix comprising rows and columns, the matrix comprising a first set of pixel elements forming the motif area, and a second set of pixel elements forming the background area,
and
providing (b):
  at least one continuous electronically conductive patterned electrode layer arranged, in the viewing direction, behind the electrolyte segments, wherein the patterned electrode layer extends across at least two rows and two columns of the matrix, and is electronically connected to the electrolyte segments of at least a subset of the first set of pixel elements, the subset comprising at least two pixel elements,
  wherein, upon application of an electric potential difference between the patterned electrode layer and the pixel electrode layer, the pixel elements of at least a subset of the first set of pixel elements switch coloring state.

In other words, a first manufacturer may preform the first set of steps (a), deliver the not yet fully completed display device to a second manufacturer, who performs a second set of steps (b), i.e. provides at least one continuous electronically conductive patterned electrode layer to the display device received from the first manufacturer. In yet other words, the second manufacturer can freely decide which image that the display is to show.

According to an exemplifying embodiment, the method further comprises providing the pixel electrode layer with regions of different wetting properties on a back side of the pixel electrode layer, wherein the step of providing the electrolyte comprises uniform deposition of the electrolyte on the back side of the pixel electrode layer, wherein the electrolyte will be self-aligned, or is arranged to self-align, into the electrolyte segments by attracting and repelling action in relation to the respective regions of different wetting properties. Self-alignment of the electrolyte advantageously facilitates the manufacturing of the fixed image display device by reducing the number of processing steps and by providing alignment of the electrolyte segments to pixel portions of the pixel layer, e.g. setting aside the need for registration.

According to yet an exemplifying embodiment of the method, it comprises providing an insulating layer comprising, in the viewing direction, a front side and a back side, and providing a plurality of geometrically separated counter electrode segments on the front side of the insulating layer, which counter electrodes have different wetting properties in relation to the insulating layer, wherein the step of providing the electrolyte comprises uniform provision of the electrolyte on the insulating layer, wherein the electrolyte self-arranges, or self-aligns, into geometrically separated electrolyte segments on top of the counter electrodes, respectively, by attracting and repelling action in relation to the different wetting properties of the counter electrodes and the insulating layer. Hence, manufacturing may be further facilitated by reducing the number of processing steps, wherein two separate self-aligning processes are provided for the two electrolyte layers.

Hence, during self-alignment, the wetting property of intermediate surfaces between the pixel portions of the pixel layer, and/or between the counter electrode segments provided on the insulating layer, is arranged to act more repelling on the electrolyte compared to the wetting property of the surfaces of the plurality of pixel portions and/or the counter electrode segments, whereby, at least after a predetermined time period and at least throughout a first portion of the pixel layer comprising a number of pixel portions and/or the insulating layer comprising a number of counter electrode segments, the electrolyte is concentrated to the surfaces of the plurality of pixel portions and/or counter electrode segments, and the surfaces of the intermediate surfaces are substantially free of electrolyte.

The method for manufacturing a fixed image display device may, according to a further embodiment, comprise geometrical alignment of the electrolyte segments on the counter electrodes with the electrolyte segments on the pixel electrode layer, and laminating the front side of the insulating layer on the back side of the pixel electrode layer, wherein each electrolyte segment of the insulating layer combines with a respective electrolyte segment of the pixel electrode layer.

The provided electrolyte may be a solidifying, or solidifiable, electrolyte which may e.g. be solidified upon thermal or UV curing. During a self-alignment phase, the electrolyte is still not solidified, or only partially solidified.

DEFINITIONS

Dynamic image display device: a dynamic image display device comprises control means for displaying different or moving images, such that the displayed image may be changed.

Fixed image display: a fixed image display device is not arranged to display different or moving images. Instead, the fixed image display device is arranged to, upon activation, display one single fixed image. This single fixed image may alternately be turned on and off, e.g. by means of a control electronics.

Off state: the off state or the in-active state of the device is when the power is turned off, and all pixels of the display have substantially the same color and appearance. I.e. a voltage applied across the display, if any, is not sufficiently high to cause a change in color of the pixels of the display. Further, this color of the pixels is referred to as the background color of the display.

On state: the on state or the active state of the device is when the power is turned on and a subset of the pixels of the display has a color which is substantially different from the background color of the display. This color is referred to as the motif color of the display. The color change of the pixels is initiated and progressed by a voltage difference being applied across the display via one or more of said patterned electrode layers.

Motif/Background: In order to facilitate the reading of the text herein the motif area is defined as the structure or structures that is/are built up by, or comprises, pixels substantially changing color in response to a voltage being applied to the display device, i.e. pixels electrically connected to a patterned electrode layer. Correspondingly, the background area is defined as the area or areas that is/are built up by, or comprises, pixels which color state remains substantially the same when a voltage is applied to the display device. Consequently, if the electrochromic material darkens when a voltage is applied thereto, and there is a desire to illustrate the moon on a dark sky—the motif would be the sky, and the moon would be the background, as the pixels constituting the sky is connected to one or more patterned electrode layers, while the pixels constituting the moon is not.

Provided there are more than one patterned electrode layer, different potentials may be applied to different patterned electrode layers and thereby giving raise to a varying color and/or contrast changing rate for different sets of pixels, i.e. causing a difference in color, such as the lightness and/or color tone, between pixels being connected to different patterned electrode layers.

Active display: an active display is a display which is arranged in its on state.

Active pixel: an active pixel is a pixel which is electronically connected to a patterned electrode layer.

Pixelated: an image that is built up by a number of pixels, which pixels may or may not have the same shape, is referred to as being pixelated. According to one embodiment, all pixels have substantially the same shape and are ordered in a repeating manner, such that the same shape occurs according to a predetermined pattern. Alternatively, the pixels have varying shapes but are ordered in a repeating manner, such that the same shape occurs according to a predetermined pattern.

Non-active display: a non-active display is a display which is arranged in its off state.

Layer: according to one embodiment, the fixed image display device has a laminate structure and consists of "layers" of different materials. These layers can be continuous and/or patterned, and can be applied to each other (self-supporting device) or to a support or carrier (supported device). These terms, self-supporting/supported, may also be used for a separate layer. A self-supporting layer is a layer which may be handled on its own and e.g. mounted in a printing machine, without collapsing and without the need of additional supporting layers. Furthermore, the term layer may encompass all of the same material in the same plane, regardless whether this material is patterned or interrupted in such a way as to form discontinuous "islands" in the plane.

Insulating layer: the insulating layer preferably comprises plastic or is formed of a layer comprising plastic, a plastic insulating layer, a plastic film or plastic foil such as a polyester foil. As for the plastic insulating layer or the insulating layer comprising plastic, it may involve e.g. films, foaming films or laminated films thereof comprising, for example, polyolefin such as polyethylene, polypropylene or the like; polyester such as polyethylene terephthalate, polyethylene naphthalate, polybutylene terephthalate or the like; polyvinyl chloride, polystyrene, polyurethane, polycarbonate, polyamide, polyimide, poly methyl methacrylate, polybutene, polybutadiene, poly methyl pentene, ethylene-vinyl acetate copolymer, ethylene (meth)acrylic copolymer, ethylene (meth)acrylate copolymer, ABS resin, ionomer resin or the like, but is not limited to theses examples. Also, as for layers, commercial films can be used, and films formed by a cast film process using a process material may also be used.

For example, the display device may comprise a continuous layer of insulating material forming the insulating layer of at least some of said plurality of pixel elements. In other words, the insulation layer of several pixel elements may each be a separate portion of a continuous insulating layer.

Electrochromic: An electrochromic material(s) may be organic or inorganic, low molecular or polymeric. Such an electrochromic layer, independent of whether it is composed of one material or is an ensemble of more than one material, combines the following properties: at least one material is electrically conducting, i.e. electronically and/or ionically conducting, in at least one oxidation state, and at least one material is electrochromic, i.e. exhibits color change as a result of electrochemical redox reactions within the material. Optionally, the electrochromic layer may comprise an electrochemically active material.

Electrochemically active: an "electrochemically active" layer according to the present invention is a piece of a material having an electronic conductivity that can be electrochemically altered through change of the redox state of said material. Normally, at least a portion of an electrochemically active element is in ionic contact with an electrolyte, and the electrochemically active element may furthermore be integrated with one or more electrodes, where said electrodes are being composed of the same or different materials as the electrochemically active element. The electrode may also be arranged on top of said electrochemically active material.

Coloring state/change: when reference is made to "coloring state/change", this is also meant to include changes in optical density or reflectance, so that "coloring change" or "coloring state" for example takes into account changes, or intermediate states, from blue to red, blue to colorless, colorless to blue, dark green to light green, grey to white or dark grey to light grey alike.

Electrochemically active region: In relation to this invention the electrochemically active region of a pixel element may be defined by the interface between the electrolyte segment and the associated pixel portion of the electrochemically active pixel layer.

In optional embodiments of the fixed image display device, electrodes, such as the patterned electrode layer and/or the counter electrode segments, comprises an electronically conducting material capable of conducting electrons, such as electronically conductive polymers, for example PEDOT: PSS (poly(3,4-ethylenedioxythiophene) poly(styrene sulfonate)), carbon, inert metals or electrochemically inert metals or materials such as gold, titanium, platinum, graphite, graphene, noble metals and inert metals, or other conducting material which may be suitable for being in contact with electrochemically active layers, or combinations of such electron conductive materials. Normally, conducting materials suitable for being in contact with electrochemically active layers are inert such that they do not give rise to substantial electrochemical reactions. These materials may e.g. be provided as an ink or paste which may be arranged in passages or vias during a manufacturing, or pre-manufacturing, process.

Direct physical contact: Direct physical contact (common interface) between two phases that allows for the exchange of charges through the interface. Charge exchange through the interface can comprise transfer of electrons between electronically conducting phases, transfer of ions between ionically conducting phases, or conversion between electronic current and ionic current by means of electrochemistry at an interface between for example counter electrode and electrolyte or an interface between electrolyte and electrochromic layer, or material, or by occurrence of capacitive currents due to the charging of the Helmholtz layer at such an interface.

Electronically connected: a first and a second material or item are electronically connected, i.e. in electronic contact with each other, when electrons may be transported from the first material/feature at least up to the second material/feature, and/or vice versa. A first and a second material/-feature are also electronically connected, i.e. in electronic contact with each other, when electrons may be transported from the first material/feature up to, and into, the second material/feature, and/or vice versa. Hence, an electronic conductor may be in electronic contact with, or electronically connected to, an electrolyte. Two electronic conductors may also by in electronic contact with each other.

In direct electronic contact: a first and a second material/feature are in direct electronic contact with each other, when electrons may be transported along the first material/feature at least up to the interface between the first and the second materials/features, and/or vice versa.

In indirect electronic contact: a first and a second materials/features are in indirect electronic contact with each other, when electrons may be transported from the first material/feature, via a third or more material(s)/feature(s), at least up to the second material/feature; and/or from the second material/feature, via the third or more material(s)/feature(s), at least up to the first material/feature.

In other words, two materials may be in electronic contact with each other, or electronically connected to each other, e.g. by direct physical contact or via a third intermediate material. A layer of carbon in direct contact (common interface) with a first and a second electrochemically active layer is one example of a material which may provide electronic contact between the two electrochemically active layers. Furthermore, two materials may be electronically connected by being in direct electronic contact or by being in indirect electronic contact.

Ionically connected: a first and a second material are ionically connected when ions may be transported from the first material to the second material, and/or vice versa. In more detail, a first and a second material are ionically connected, or in direct ionic contact, when ions may be transported from the first material at least to the interface between the first and the second material, and/or vice versa.

Ionic contact between two elements is e.g. provided by at least one material being capable of transporting ions between the two elements. An electrolyte, in direct ionic contact (common interface) with an electrochemically active layer and a patterned electrode layer, is one example of a material which may provide ionic contact between the electrochemically active layer and the patterned electrode layer. The electrolyte may hence be referred to as being in ionic contact with, or ionically connected to, each one of the electrochemically active layer and the patterned electrode layer.

According to an embodiment of the fixed image display device, it may comprise, as electrochromic material and/or electrochemically active material, a polymer which is electronically conducting in at least one oxidation state, and optionally also comprises a polyanion compound.

Electrochromic and electrochemically active polymers for use in the fixed image display device of the present invention are for example selected from the group consisting of electrochromic polythiophenes, electrochromic polypyrroles, electrochromic polyanilines, electrochromic polyisothianaphthalenes, electrochromic polyphenylene vinylenes and copolymers thereof. In an embodiment, the electrochromic polymer is a homopolymer or copolymer of a 3,4-dialkoxythiophene, in which said two alkoxy groups may be the same or different or together represent an optionally substituted oxy-alkylene-oxy bridge. In yet an embodiment, the electrochromic polymer is a homopolymer or copolymer of a 3,4-dialkoxythiophene selected from the group consisting of poly(3,4-methylenedioxythiophene), poly(3,4-methylenedioxythiophene) derivatives, poly(3,4-ethylenedioxythiophene), poly(3,4-ethylenedioxythiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives, and copolymers therewith. The polyanion compound is then preferably poly(styrene sulfonate).

As is readily appreciated by the skilled man, in alternative embodiments of the invention, the electrochromic material comprises any non-polymer material, combination of different non-polymer materials, or combination of polymer materials with non-polymer materials, which exhibit conductivity in at least one oxidation state as well as electrochromic behavior. For example, one could use a composite of an electronically conducting material and an electrochromic material, such as electronically conductive particles, such as indium tin oxide (ITO) or antimony tin oxide (ATO), with polymer or non-polymer electrochromic materials such as polyaniline, polypyrrole, polythiophene, nickel oxide, polyvinylferrocene, polyviologen, tungsten oxide, iridium oxide, molybdenum oxide and Prussian blue (ferric ferrocyanide). As non-limiting examples of electrochromic elements for use in the device of the invention, mention can be made of: a piece of PEDOT:PSS, being both conducting and electrochromic; a piece of PEDOT:PSS with $Fe^{2+}/SCN^-$, PEDOT:PSS being conducting and electrochromic and $Fe^{2+}/SCN^-$ being an additional electrochromic component (see below); a piece composed of a continuous network of conducting ITO particles in an insulating polymeric matrix, in direct electronic contact with an electrochromic WO3-coating; a piece composed of a continuous network of conducting ITO particles in an insulating polymeric matrix, in contact with an electrochromic component dissolved in an electrolyte. As described above, a fixed image display device may comprise a further electrochromic material for realization of displays with more than one color. This further electrochromic material can be provided within the electrochromic pixel element or the solidified electrolyte, which then for example comprises an electrochromic redox system, such as the redox pair of colorless $Fe^{2+}$ and SCN— ions on one hand, and of red $Fe^{3+}$ $(SCN)(H2O)_5$ complex on the other. By way of further, non-limiting example, such materials may be selected from different phenazines such as DMPA-5,10-dihydro-5,10-dimethylphenazine, DEPA-5,10-dihydro-5,10-diethylphenazine and DOPA-5,10-dihydro-5,10-dioctylphenazine, from TMPD-N,N,N',N'-tetramethylphenylenediamine, TMBZ-N, N,N',N'-tetramethylbenzidine, TTF-tetrathiafulvalene, phenanthroline-iron complexes, erioglaucin A, diphenylamines, p-ethoxychrysoidine, methylene blue, different indigos and phenosafranines, as well as mixtures thereof.

Solidified electrolyte: for the purposes of the invention, "solidified electrolyte" means an electrolyte, which at the temperatures at which it is used is sufficiently rigid that particles/flakes in the bulk therein are substantially immobilized by the high viscosity/rigidity of the electrolyte and that it does not flow or leak. In the preferred case, such an electrolyte has the proper rheological properties to allow for application of this material on a support in an integral sheet or in a pattern, for example by conventional printing methods. After deposition, the electrolyte formulation should solidify upon evaporation of solvent or because of a chemical cross-linking reaction, brought about by additional chemical reagents or by physical effect, such as irradiation by ultraviolet, infrared or microwave radiation, cooling or any other such. The solidified electrolyte may for example comprise an aqueous or organic solvent-containing gel, such as gelatine or a polymeric gel. However, solid polymeric electrolytes are also contemplated and fall within the scope of the present invention. Furthermore, the definition also encompasses liquid electrolyte solutions soaked into, or in any other way hosted by, an appropriate matrix material, such as a paper, a fabric or a porous polymer. In some embodiments of the invention, this material is in fact the support upon which the electrochromic device is arranged, so that the support forms an integral part of the operation of the electrochromic device.

The solidified electrolyte may comprise a binder. It is preferred that this binder have gelling properties. The binder is preferably selected from the group consisting of gelatine, a gelatine derivative, polyacrylic acid, polymethacrylic acid, poly(vinylpyrrolidone), polysaccharides, polyacrylamides, polyurethanes, polypropylene oxides, polyethylene oxides, poly(styrene sulphonic acid) and poly(vinyl alcohol), and salts and copolymers thereof; and may optionally be cross-linked. The solidified electrolyte preferably further comprises an ionic salt, preferably magnesium sulphate if the binder employed is gelatine. The solidified electrolyte preferably further contains a hygroscopic salt such as magnesium chloride to maintain the water content therein. The electrolyte may be formed by one of the materials listed above or by a combination of two or more of these materials. For example, the electrolyte has reological properties which makes it suitable for printing e.g. by ink-jet printing or by a roll-to-roll process. Regarding reological properties, electrolyte viscosity may be considered. Exemplifying intervals of electrolyte viscosity (mPas) for different printing methods are:

Inkjet printing: 1-20
Flexo printing: 20-400
Screen printing: 1000-100000
Offset printing: 1000-100000
Gravure printing: 20-200

In summary, the material selection and the vertical architectural configuration of the fixed image display device according to the present invention allows for a manufacturing process comprising conventional printing techniques. Such conventional printing techniques may encompass bar coating, screen printing, spin-coating, ink-jet printing, aerosol-jet printing, or any other such manufacturing procedure. The architecture of the fixed image display device also allows for use of manufacturing procedures that are easily scalable to larger scale manufacturing, which, in turn, allows for faster and low cost manufacturing, such as low-cost printing described above.

Generally, other objectives, features, and advantages of the present invention that will appear from the following detailed disclosure, from the attached dependent claims as well as from the drawings are equally possible within the scope of the invention.

BRIEF DESCRIPTION OF DRAWINGS

Embodiments of the invention will now be described, by way of example, with reference to the accompanying drawings, wherein.

Figure 1A:
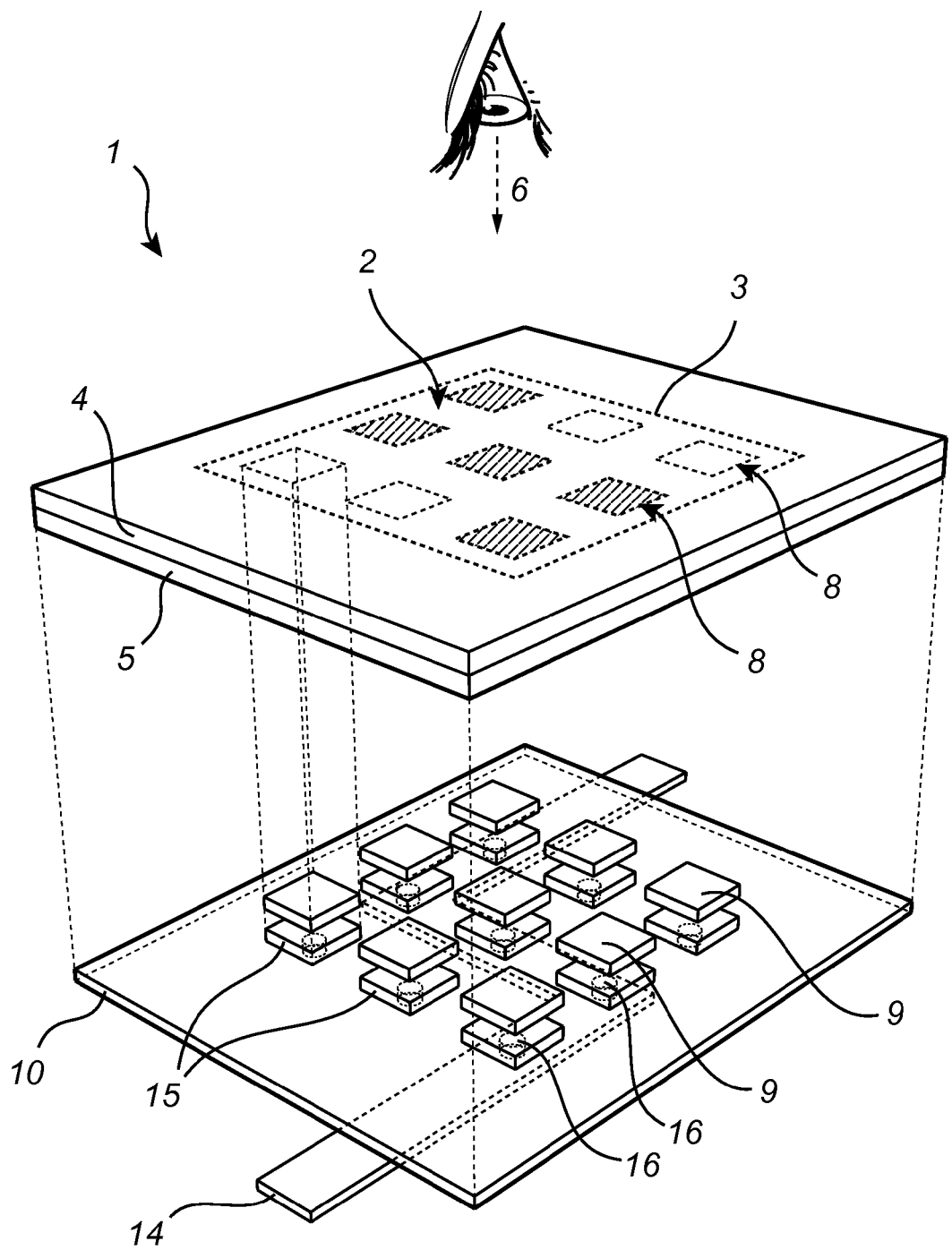
FIG. 1a is a schematic, partly exploded, perspective view of an embodiment of the flexible fixed image display according to the present invention.

It should be understood that the drawings are not true to scale and, as is readily appreciated by a person skilled in the art, dimensions other than those illustrated in the drawings are equally possible within the scope of the invention.

DETAILED DESCRIPTION OF EMBODIMENTS OF THE INVENTION

In the drawings, similar or equal elements are referred to by the same reference numerals.

Figure 2A:
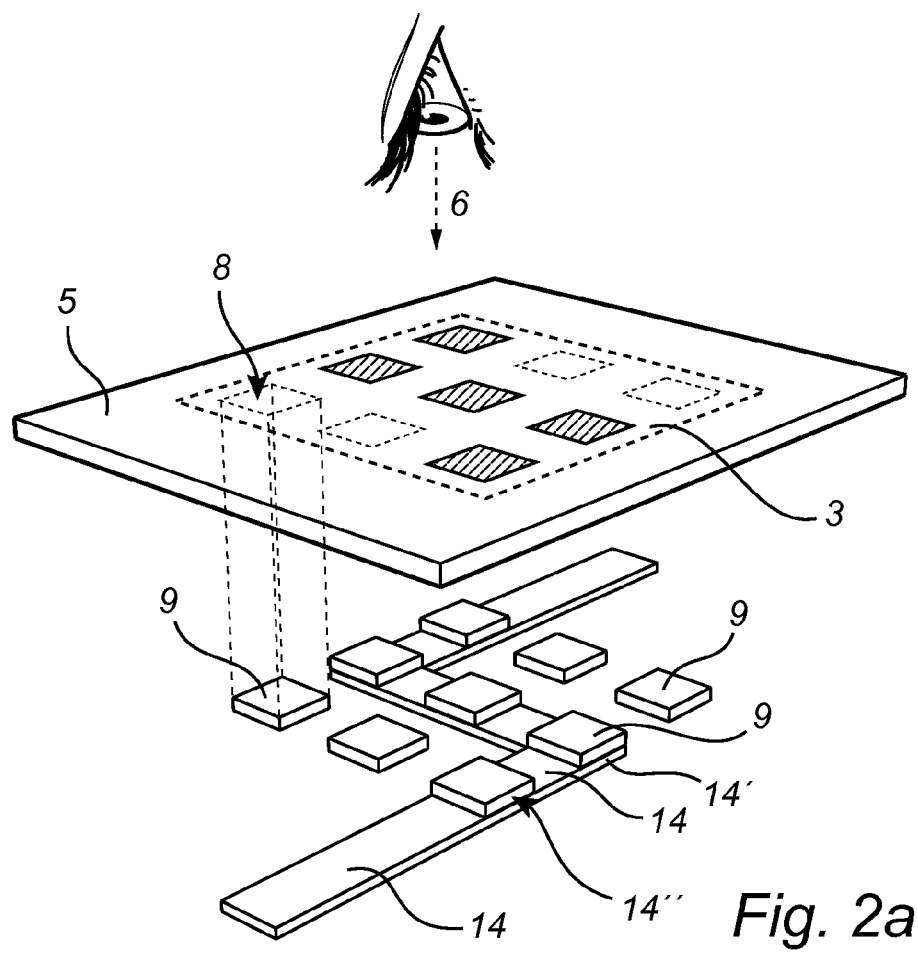
FIG. 2a is a schematic, partly exploded, perspective view of an embodiment of the flexible fixed image display according to the present invention.

In FIG. 1a and FIG. 2a, schematic, partly exploded, perspective views of two exemplifying embodiments of the flexible fixed image display device 1 according to the present invention, are shown. The device 1 comprises a display area 3 in which a predetermined fixed image is arranged to appear for an end user observing the display device, e.g. in a viewing direction 6, when it is activated. The display area 3 is formed on, or in, an electrochromic and electrochemically active pixel electrode layer 5 which is continuous throughout the display area 3, typically without any interruptions or voids. For example, the display area 3 is formed of the pixel electrode layer 5, and may be a center or off-center portion of the pixel electrode layer 5. The display area 3 of the pixel electrode layer 5 further comprises a plurality of pixel portions 8 which are arranged in a matrix, wherein a plurality of geometrically separated essentially opaque electrolyte segments 9 are arranged in direct physical contact with respective pixel portions 8, on a back side surface of the pixel electrode layer 5, as seen in the viewing direction. Each set of pixel portion 8 and respective electrolyte segment 9 forms a pixel element. As illustrated, the matrix is formed of essentially orthogonal rows and columns of pixel portions 8 and electrolyte segments 9. However, the matrix may e.g. comprise rows and/or columns which are angled in relation to each other, and/or rows and columns which are curved or arranged in a non symmetrical configuration in relation to each other.

Furthermore, each electrolyte segment is ionically isolated from the surrounding electrolyte segments, and each electrolyte segment 9 comprises a front side surface which physically contacts the pixel electrode layer 5 such that separate pixel elements are formed, wherein each pixel element comprises an electrochemically active interface region between the pixel electrode layer 5 and the electrolyte segments 9. In other words, the geometrically separated interface regions between the electrolyte segments 9 and the continuous pixel electrode layer 5 defines the extension of the pixel elements which are used to form the fixed image to be output to the viewer. In practice, the interface region between the pixel electrode layer 5 and the electrolyte segment 9 also affects and restricts the electrochemical reaction of the pixel element during operation of the device, such that coloring of the pixel electrode layer is essentially confined to the regions of and in close proximity to the interface regions.

With reference to the embodiment shown in FIG. 1a, the fixed image display 1 comprises a continuous electronically conductive patterned electrode layer 14, wherein the exact pattern of the patterned electrode layer 14 is used to define the fixed image by electronically contacting only some of the electrolyte segments 9 of the plurality of pixel elements and thereby activating those pixel elements. In more detail, all pixel elements are arranged in a matrix comprising rows and columns and the patterned electrode layer 14 is patterned in a complex pattern such that it at least extends across two rows and two columns of pixel elements of the matrix, wherein the patterned electrode layer 14 electronically contacts and activates those pixel elements. Hence, the patterning of the patterned electrode layer 14, of which there may be more than one, is used for defining which pixel elements being part of a first set of pixel elements which are arranged to form the motif area of the fixed image, in relation to the second set of pixel elements which are not activated by the patterned electrode layer 14 and thereby form the background area of the fixed image.

The first set of active pixel elements which form the motif area, in the following also referred to as the motif pixel elements, may be contacted by separate patterned electrode layers 14, each of which defines a portion of the complete fixed image to be outputted by the fixed image display device, wherein each patterned electrode layer 14 contacts a separate subset of pixel elements of the first set of pixel elements.

As further illustrated in FIG. 1a, the fixed image display device 1 comprises a transparent top layer 4 which is arranged, in the viewing direction, in front of the pixel electrode layer 5, and continuously covers the display area 3 of the pixel electrode. The top layer forms e.g. a protective cover for the pixel electrode layer 5. The top layer may also form a carrier device for the pixel electrode layer which facilitates manufacturing, such as low-cost printing, wherein the pixel electrode layer, such as a thin and/or non-self-supportive pixel electrode layer, may be printed onto a back side surface of the top layer 4. The top layer has uniform thickness and may be formed of a transparent plastic layer.

The fixed image display device 1 further comprises a continuous insulating layer 10 arranged between the pixel electrode layer 5 and the patterned electrode layer 14, directly adjacent to the patterned electrode layer. The insulating layer further comprises a plurality of passages 16 which enable electronic connection between the patterned electrode layer 14 and the electrolyte segments 9. For example, the passages 16 are prefabricated in a separate process in relation to the manufacturing of the fixed image display device. The passages 16 may advantageously be fabricated using laser drilling techniques.

As further illustrated, the fixed image display device 1 comprises a plurality of geometrically separated counter electrode segments 15 which are arranged behind, and in direct contact with a back side surface of the respective electrolyte segment. The counter electrode segments 15 are provided, e.g. by printing, on a front side of the insulating layer 10, wherein the passages 16 in the insulating layer 10 comprises an electronically conductive material (16' in FIG. 1b) which electronically connects each separated counter electrode segment 15 with the patterned electrode layer 14 which is printed on a back side surface of the insulating layer 10, in relation to the viewing direction 6.

Figure 1B:
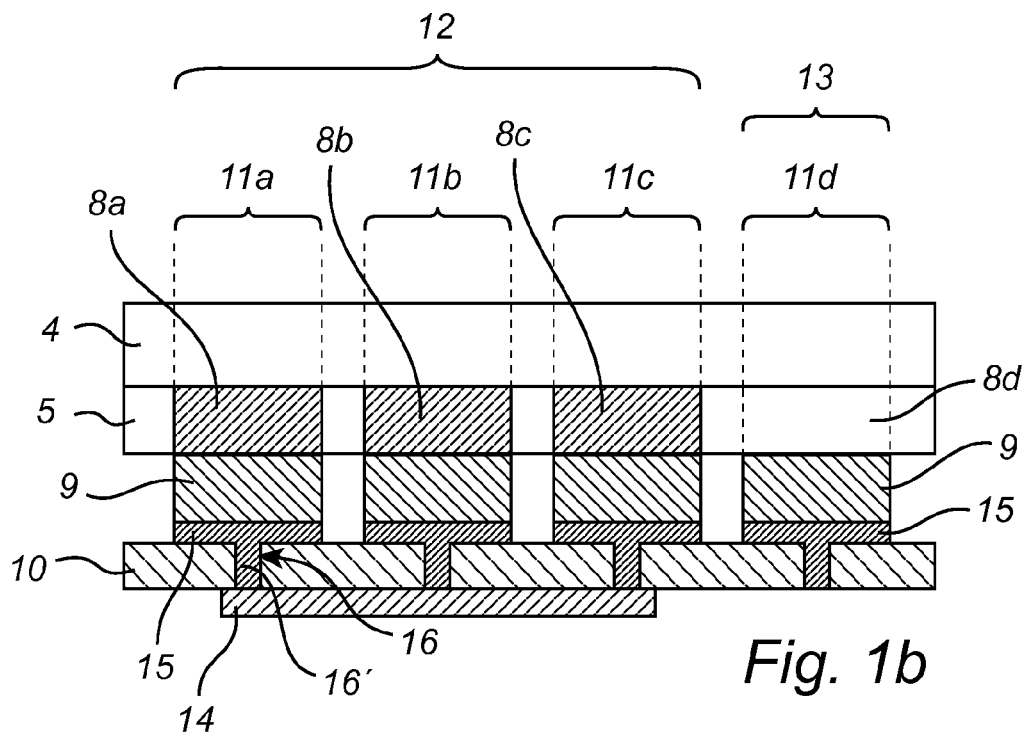
FIG. 1b is a schematic cross-sectional view of an embodiment of the flexible fixed image display device according to the present invention.

In FIG. 1b, a schematic cross-sectional view of an embodiment of the flexible fixed image display device 1 is illustrated, which display device 1 is arranged in a similar manner as described with reference to FIG. 1a, if not stated or depicted otherwise. The patterned electrode layer 14 is printed on the back side surface of the insulating layer 10 and contacts the motif pixel elements 11a, 11b, and 11c, belonging to the first set of pixel elements 12, via counter electrodes 15, which are further arranged in passages 16, while background pixel element 11d, belonging to the second set of pixel elements 13, is not contacted and not activated by the patterned electrode layer 14. In other words, the patterned electrode layer 14 is arranged to only contact the predetermined motif pixel elements which form the motif area of the fixed image.

As further illustrated in FIG. 1b, the fixed image display device is illustrated in an activated state, wherein the respective pixel portions 8a, 8b, 8c of the electrochromic pixel electrode layer 5 associated with motif pixel elements 11a, 11b, 11c have switched their coloring state in relation to the background pixel element 11d. Hence, during operation, the background pixel elements are maintained in an original state during activation of the display device. For example, the motif pixel elements are activated simultaneously by activation of a potential difference between the pixel electrode layer 5 and the patterned electrode layer 14. For example, the applied potential difference drives a current which generates an electrochemical redox reaction, such as oxidation or reduction, in the motif pixel elements such that the pixel electrode layer switches coloring state in the pixel portions 8a, 8b, 8c of the motif pixel elements.

In the illustrated embodiment, the pixel electrode layer is formed of an electrochromic and electrically conductive polymer material, e.g. as described above, such as a flexible layer of PEDOT:PSS. Other material with similar properties and functions, however, may advantageously be utilized.

With reference to FIG. 2a, a fixed image display device 1 is arranged as described in relation to the fixed image display device described in relation to FIG. 1a unless stated otherwise. However, in this embodiment, the patterned electrode layer 14 is arranged, or printed, directly onto the electrolyte segments 9 of the motif pixel elements. Hence, the patterned electrode layer 14 is arranged in direct ionic contact with the electrolyte segments 9 of the motif pixel elements, wherein geometrically separated and electronically interconnected electrode portions 14' of the patterned electrode layer 14 form counter electrodes for the motif pixel elements. In other words, the patterned electrode layer is used for defining the fixed image by patterning it according to a selected fixed image, and used for counter electrode for the selected pixel electrodes which form the motif area of the fixed image. In this embodiment, the electrolyte segments 9 and the patterned electrode layer 14 may e.g. be printed directly on the pixel electrode layer 5 which forms a support and/or carrier layer for the display device during manufacturing.

Figure 2B:
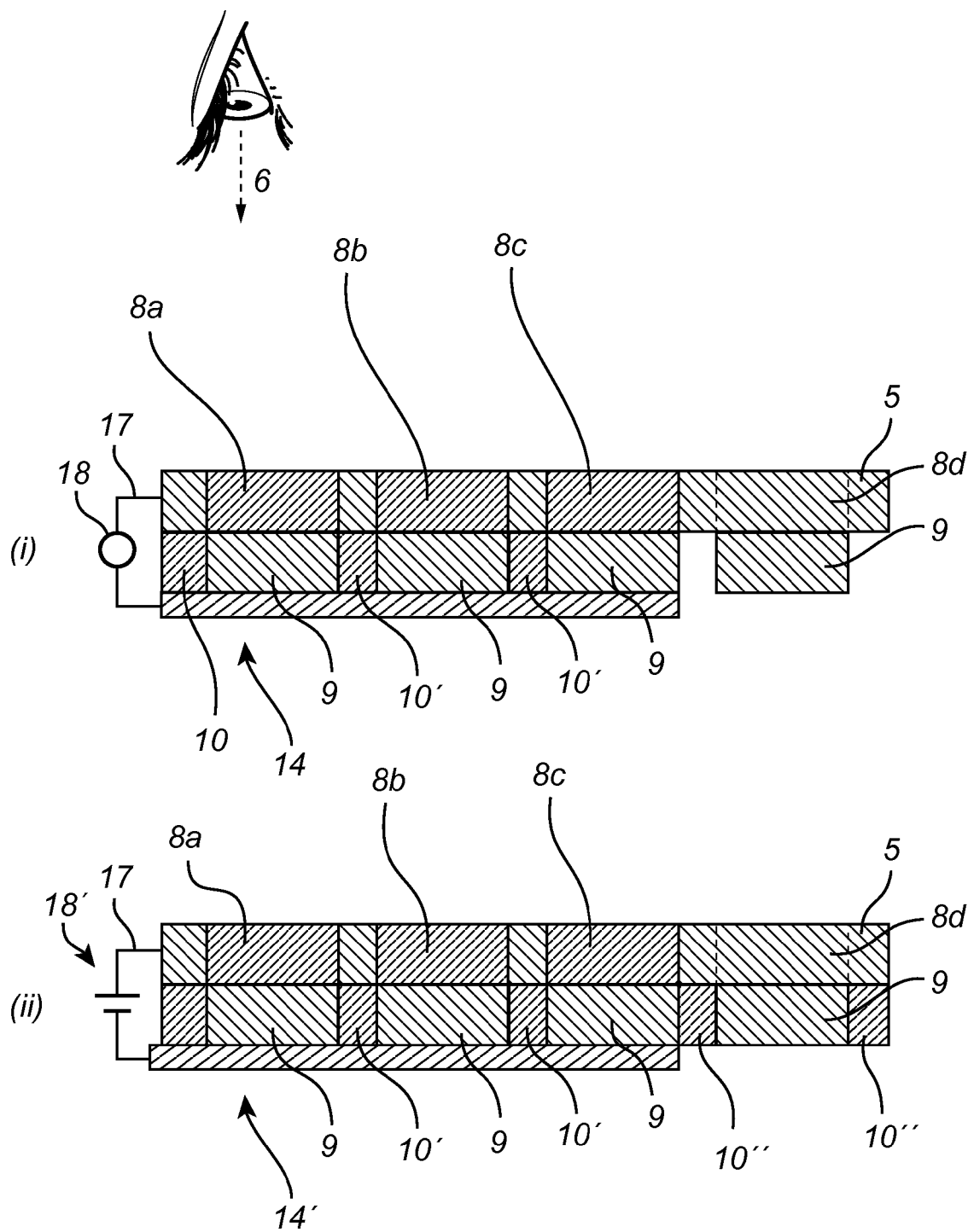
FIG. 2b are schematic cross-sectional views of embodiments of the flexible fixed image display device according to the present invention.

In FIG. 2b schematic cross-sectional views of two exemplifying embodiments of the flexible fixed image display device 1, are illustrated, which display devices 1 are arranged in a similar manner as described with reference to FIG. 2a, if not stated or depicted otherwise.

In order to prevent, or mitigate, short-circuits between the patterned electrode layer 14 and the pixel electrode layer 5, an insulating material, an insulating layer, a lacquer layer or grid 10 may be provided in the intermediate regions between the electrolyte segments 9, between the lower depicted patterned electrode layer 14 and the upper depicted pixel electrode layer 5. For example, the insulating material 10 comprising openings arranged to accommodate the electrolyte segments 9. With reference to embodiment (i), the insulating layer 10 is arranged in the regions 10' between the lower depicted patterned electrode layer 14 and the upper depicted pixel electrode layer 5. Hence, the insulating layer 10 is only arranged at locations where the patterned electrode is provided and where it is a risk that interference, or short-circuit, between the patterned electrode layer 14 and the pixel electrode layer 5 occurs. With reference to embodiment (ii), the insulating material 10 forms a continuous insulating layer, or grid, which extends over the complete display area of the fixed image display device 1, wherein the electrolyte segments of all the pixel elements, both active and non-active, are arranged in a separate opening in the continuous insulating layer, or grid, 10. Hence, the insulating material is arranged both in active regions of the display device 1 indicated by 10' and in non-active regions of the display device 1 indicated by 10".

As further illustrated in FIG. 2b, the fixed image display devices 1 may be activated by application of a potential difference between a contact portion 14' of the patterned electrode layer 14 and the pixel electrode layer 5 with operating circuitry 17 comprising a control unit 18, and/or a power source 18', arranged to switch the motif pixels essentially simultaneously. For example, one common contact portion 14' of a specific patterned electrode layer 14 is used for driving all motif pixel elements in the subset of pixel elements contacted by that specific patterned electrode layer. As illustrated, upon activation of the display device, the pixel portions 8a, 8b, 8c corresponding to the active motif pixel elements switch their coloring state. Pixel portion 8d corresponds to the background pixel elements which are not contacted by the patterned electrode layer 14.

Figures 3A, 3B:
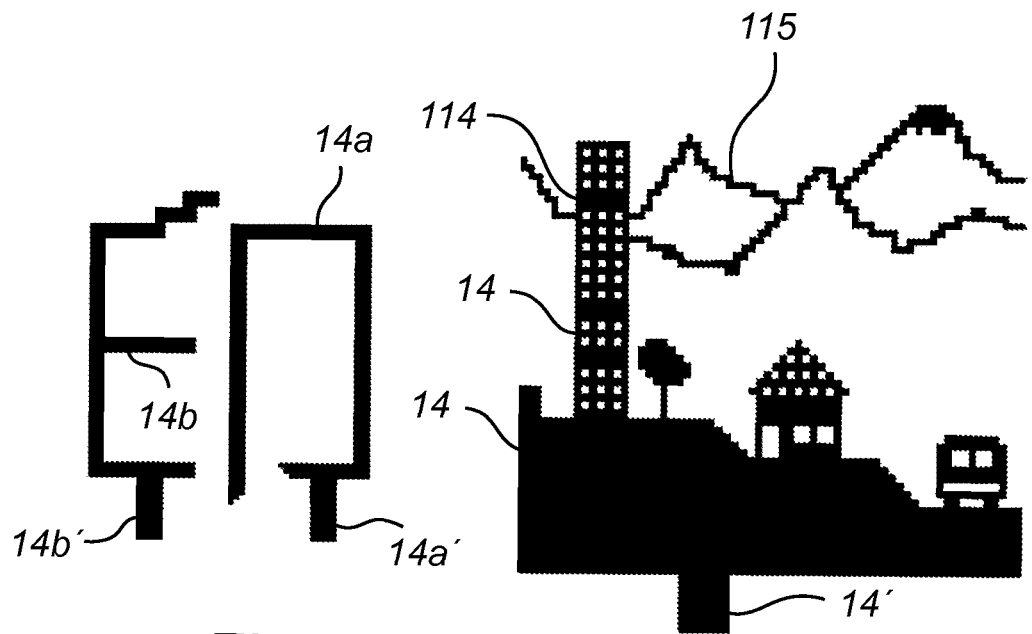
FIGS. 3a-d are schematic representations of various embodiments of the patterned electrode layer of the flexible fixed image display device according to the present invention.

In FIGS. 3a-d, schematic representations of various embodiments of the patterned electrode layer 14 of the flexible fixed image display device, are illustrated. With reference to FIG. 3a, the patterned electrode layer 14 has the shape of a figurative motif, here it is patterned into a landscape motif comprising motif features, such as houses, a tree, a scenic mountain, etc., wherein the motif features are determined and formed by one continuous patterned electrode layer 14. Hence, the predetermined shape which defines the fixed image to be output by the display device allows for use of a single patterned electrode layer 14. The patterned electrode layer 14 further comprises a contact portion 14' which extends outside the display area.

With reference to FIG. 3b, the fixed image to be output is formed by a first and a second electrode layer 14a and 14b, each comprising a respective contact portion 14'a and 14'b, used for application of an activation voltage. According to this example, electrodes 14a and 14b have the shape of a Chinese character meaning mark/stamp in Japan.

Figures 3C, 3D:
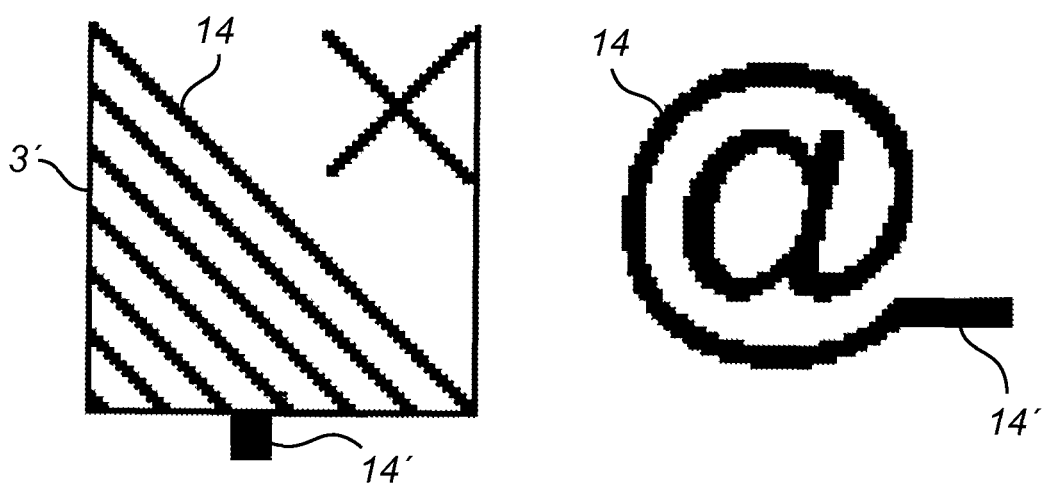

In FIG. 3c, the patterned electrode layer has the shape of a graphical symbol. In more detail it has the shape of an 'at' sign (@).

With reference to FIG. 3d, the patterned electrode layer has the shape of a graphical symbol, in more detail it is arranged in an arbitrary pattern comprising parallel and crossing lines formed by one continuous patterned electrode layer 14 extending along at least one peripheral edge 3' of the display area. Hence, the different separated regions of pixel elements may be connected with one patterned electrode layer 14 without interfering with the motif of the fixed image in the display area.

With reference to FIG. 3a, the patterned electrode layer 14 comprises an overlapping portion 114 which is arranged into the shape of a building or house, wherein the overlapping portion 114 overlaps a plurality of adjacent pixel elements which are arranged next to each other in the matrix configuration. The overlapping portion also comprises open regions for providing regions of non-active background pixel elements which are surrounded by the overlapping portion. For example, the overlapping portion comprises at least one motif pixel element which is fully surrounded by motif pixel elements. Furthermore, the patterned electrode layer comprises line portions 115 which connects a line of pixel elements in an arbitrary direction, such as in a zigzag pattern or meander pattern winding over the display area in order to define the fixed image to be outputted by the fixed image display device.

It should be noted that the invention has mainly been described above with reference to a few embodiments. However, as is readily appreciated by a person skilled in the art, other embodiments than the ones disclosed above are equally possible within the scope of the invention, as defined by the appended claims. It is further noted that, in the claims, the word "comprising" does not exclude other elements or steps, and the indefinite article "a" or "an" does not exclude a plurality. The mere fact that certain features or steps are recited in mutually different dependent claims does not indicate that a combination of these features or steps cannot be used to an advantage.

The invention claimed is:

1. A flexible, fixed image display device arranged to display, when activated, a predetermined fixed image in a display area, the fixed image comprising at least one motif area and at least one background area, which display device comprises:
a pixel electrode layer comprising the display area, which pixel electrode layer is continuous throughout the display area and comprises electrochromic and electrochemically active organic polymer material being switchable between different visually detectable coloring states, and
solidified electrolyte arranged, in a viewing direction, behind the pixel electrode layer, which solidified electrolyte is in ionic contact with the pixel electrode layer, wherein the pixel electrode layer comprises a plurality of pixel portions arranged in the display area, and
the solidified electrolyte is essentially opaque and arranged in a plurality of electrolyte segments, which segments are geometrically separated and ionically isolated from each other, each electrolyte segment being in ionic contact with a respective pixel portion of the pixel electrode layer,
wherein each electrolyte segment and respective pixel portion form a pixel element, the pixel elements being arranged in a matrix comprising rows and columns, the matrix comprising a first set of pixel elements forming the motif area, and a second set of pixel elements forming the background area,
wherein the fixed image display further comprises at least one continuous electronically conductive patterned electrode layer arranged, in the viewing direction, behind the electrolyte segments,
wherein the patterned electrode layer extends across at least two rows and two columns of the matrix, and is electronically connected to the electrolyte segments of at least a subset of the first set of pixel elements, the subset comprising at least two pixel elements,
wherein the electrolyte segments of the second set of pixel elements are configured so as to not be electronically connected to the patterned electrode layer during any operational states of the display device, and
wherein, upon application of an electric potential difference between the patterned electrode layer and the pixel electrode layer, the pixel portions of the subset of the first set of pixel elements are configured to switch coloring state to display the predetermined fixed image.

2. The fixed image display device according to claim 1, further comprising a transparent top layer which is arranged, in the viewing direction, in front of the pixel electrode layer, wherein the top layer continuously covers the display area of the pixel electrode layer.

3. The fixed image display device according to claim 1, wherein the pixel electrode layer is transparent, or semi-transparent, at least in one coloring state.

4. The fixed image display device according to claim 1, wherein the fixed image display device further comprises a continuous insulating layer arranged between the pixel electrode layer and the patterned electrode layer, directly adjacent to the patterned electrode layer,
which insulating layer comprises a plurality of passages which enable electronic connection between the patterned electrode layer and the electrolyte segments.

5. The fixed image display device according to claim 1, wherein the insulating layer is arranged in regions between the electrolyte segments, vertically between the pixel electrode layer and the patterned electrode layer.

6. The fixed image display device according to claim 1, wherein the patterned electrode layer is arranged in direct ionic contact with the electrolyte segments of the subset of pixel elements, and
wherein geometrically separated and electronically interconnected electrode portions of the patterned electrode layer form counter electrodes for the subset of pixel elements, respectively.

7. The fixed image display device according to claim 1, wherein the electrolyte comprises a dye or pigment, such as dispersed titanium dioxide particles.

8. The fixed image display device according to claim 1, wherein the patterned electrode layer comprises carbon, conductive polymer, or electrochemically inert metal.

9. The fixed image display device according to claim 1, wherein the subset of the first set of pixel elements comprises at least two, or more, pixel elements, and the second set of pixel elements comprises at least two, or more, pixel elements.

10. The fixed image display device according to claim 1, comprising a plurality of continuous electronically conductive patterned electrode layers, each patterned electrode layer being electronically connected to a respective subset of the first set of pixel elements.

11. The fixed image display device according to claim 1, wherein the electrolyte segments of the pixel elements of the second set of pixel elements are not sandwiched between the pixel electrode layer and the patterned electrode layer.

12. The fixed image display device according to claim 1, wherein the pixel elements of the second set of pixel elements are non-switchable.

13. The fixed image display device according to claim 4, wherein the insulating layer comprises a flexible plastic film with an essentially uniform thickness between 5 and 1000 µm, or between 10 and 500 µm, or between 10 and 250 µm.

14. A flexible, fixed image display device arranged to display, when activated, a predetermined fixed image in a display area, the fixed image comprising at least one motif area and at least one background area, which display device comprises:
- a pixel electrode layer comprising the display area, which pixel electrode layer is continuous throughout the display area and comprises electrochromic and electrochemically active organic polymer material being switchable between different visually detectable coloring states, and
- solidified electrolyte arranged, in a viewing direction, behind the pixel electrode layer, which solidified electrolyte is in ionic contact with the pixel electrode layer,
- wherein the pixel electrode layer comprises a plurality of pixel portions arranged in the display area, and
- the solidified electrolyte is essentially opaque and arranged in a plurality of electrolyte segments, which segments are geometrically separated and ionically isolated from each other, each electrolyte segment being in ionic contact with a respective pixel portion of the pixel electrode layer,
- wherein each electrolyte segment and respective pixel portion form a pixel element, the pixel elements being arranged in a matrix comprising rows and columns, the matrix comprising a first set of pixel elements forming the motif area, and a second set of pixel elements forming the background area,
- wherein the fixed image display further comprises at least one continuous electronically conductive patterned electrode layer arranged, in the viewing direction, behind the electrolyte segments,
- wherein the patterned electrode layer extends across at least two rows and two columns of the matrix, and is electronically connected to the electrolyte segments of at least a subset of the first set of pixel elements, the subset comprising at least two pixel elements,
- wherein, upon application of an electric potential difference between the patterned electrode layer and the pixel electrode layer, the pixel portions of the subset of the first set of pixel elements are configured to switch coloring state to display the predetermined fixed image,
- wherein the fixed image display device further comprises a continuous insulating layer arranged between the pixel electrode layer and the patterned electrode layer, directly adjacent to the patterned electrode layer,
- which insulating layer comprises a plurality of passages which enable electronic connection between the patterned electrode layer and the electrolyte segments,
- wherein the fixed image display device further comprises a plurality of geometrically separated counter electrode segments, each counter electrode segment being arranged between, and in direct contact with, a respective electrolyte segment and a front side of the insulating layer, and
- wherein each one of the plurality of passages comprises an electronically conductive material which electronically connects each separated counter electrode segment with the patterned electrode layer.

15. A method for manufacturing a flexible fixed image display device arranged to display, when activated, a predetermined fixed image in a display area, the fixed image comprising at least one motif area and at least one background area, which method comprises:
- providing a pixel electrode layer comprising the display area, which pixel electrode layer is continuous throughout the display area and comprises electrochromic and electrochemically active organic polymer material being switchable between different visually detectable coloring states, and
- providing an electrolyte arranged, in a viewing direction, behind the pixel electrode layer, which electrolyte is in ionic contact with the pixel electrode layer, wherein the method further comprises
- providing the electrolyte in a plurality of electrolyte segments, which segments are geometrically separated and ionically isolated from each other, each electrolyte segment being in ionic contact with a respective pixel portion of the pixel electrode layer, wherein each electrolyte segment and respective pixel portion form a pixel element, the pixel elements being arranged in a matrix comprising rows and columns, wherein the matrix comprises a first set of pixel elements forming the motif area and a second set of pixel elements for the background area, and
- providing a continuous electronically conductive patterned electrode layer arranged, in the viewing direction, behind the electrolyte segments, wherein the patterned electrode layer extends across at least two rows and two columns of the matrix, and is electronically connected to the electrolyte segments of at least a subset of the first set of pixel elements, the subset comprising, at least two pixel elements, wherein the electrolyte segments of the second set of pixel elements are configured so as to not be electronically connected to the patterned electrode layer during any operational states of the display device, and
- wherein, upon application of an electric potential difference between the patterned electrode layer and the pixel electrode layer, the pixel elements of the subset of the first set of pixels elements are configured to switch coloring state to display the predetermined fixed image.

16. The method for manufacturing a fixed image display device according to claim 15, further comprising:
- providing the pixel electrode layer with regions of different wetting properties on a back side of the pixel electrode layer,
- wherein the step of providing the electrolyte comprises uniform deposition of the electrolyte on the back side of the pixel electrode layer, wherein the electrolyte self-aligns into geometrically separated electrolyte segments by attracting and repelling action in relation to the respective regions of different wetting properties.

17. The method for manufacturing a fixed image display device according to claim 15, further comprising:
- providing an insulating layer comprising, in the viewing direction, a front side and a back side, and
- providing a plurality of geometrically separated counter electrode segments on the front side of the insulating layer, which counter electrodes have different wetting properties in relation to the insulating layer,
- wherein the step of providing the electrolyte comprises uniform deposition of the electrolyte on the insulating layer, wherein the electrolyte self-aligns into geometrically separated electrolyte segments on top of the counter electrodes, respectively, by attracting and repelling action in relation to the different wetting properties of the counter electrodes and the insulating layer.

18. The method for manufacturing a fixed image display device according to claim 17, further comprising:
- geometrically aligning the electrolyte segments on the counter electrodes with the electrolyte segments on the pixel electrode layer, and
- laminating the front side of the insulating layer on the back side of the pixel electrode layer, wherein each electrolyte segment of the insulating layer combines with a respective electrolyte segment of the pixel electrode layer.

19. The fixed image display device according to claim 14, wherein the insulating layer comprises a flexible plastic film with an essentially uniform thickness between 5 and 1000 μm, or between 10 and 500 μm, or between 10 and 250 μm.

* * * * *